United States Patent
Penaloza (10) Patent No.: US 12,247,418 B2
(45) Date of Patent: Mar. 11, 2025

(54) ANTI-THEFT APPARATUS FOR MOTORCYCLES

(71) Applicant: German Alfonso Penaloza, San Antonio, TX (US)

(72) Inventor: German Alfonso Penaloza, San Antonio, TX (US)

( * ) Notice: Subject to any disclaimer, the term of this patent is extended or adjusted under 35 U.S.C. 154(b) by 219 days.

(21) Appl. No.: 17/874,011

(22) Filed: Jul. 26, 2022

(65) Prior Publication Data

US 2023/0032910 A1 Feb. 2, 2023

Related U.S. Application Data

(60) Provisional application No. 63/226,394, filed on Jul. 28, 2021.

(51) Int. Cl.
| | | |
|---|---|---|
| *E05B 67/06* | (2006.01) | |
| *E05B 67/38* | (2006.01) | |
| *E05B 71/00* | (2006.01) | |

(52) U.S. Cl.
CPC ............ *E05B 67/063* (2013.01); *E05B 67/38* (2013.01); *E05B 71/00* (2013.01)

(58) Field of Classification Search
CPC ........ E05B 67/063; E05B 67/22; E05B 67/38; E05B 67/383; E05B 67/24; E05B 2067/386; E05B 2067/066; E05B 71/00; E05B 73/007; E05B 73/0076; E05B 73/0094; E05B 73/02; Y10T 70/413; Y10T 70/422; Y10T 70/424; Y10T 70/426; Y10T 70/446; Y10T 70/452; Y10T 70/454; Y10T 70/459; Y10T 70/487; Y10T 70/491; Y10T 70/493; Y10T 70/496; Y10T 70/498; Y10T 70/5637; B62H 5/08; B62H 5/10; B62H 5/0001; B62H 5/005; B62H 5/18;
(Continued)

(56) References Cited

U.S. PATENT DOCUMENTS

| | | | | |
|---|---|---|---|---|
| 577,673 | A | * 2/1897 | Wickliffe | ................. B62H 5/10 70/203 |
| 1,398,122 | A | * 11/1921 | Bender | ................. B60R 25/005 70/430 |

(Continued)

FOREIGN PATENT DOCUMENTS

GB 2460062 A * 11/2009 ............... B62H 5/10

*Primary Examiner* — Alyson M Merlino
(74) *Attorney, Agent, or Firm* — Outlier Patent Attorneys, PLLC (57) ABSTRACT

An anti-theft apparatus that attaches to a shift lever and a foot rest of a motorcycle includes a shackle that is sized and shaped to extend from the foot rest to the shift lever. The shackle has an open end, a second end opposite of the open end, and two elongate arms that extend between the second end and the open end. A locking mechanism engages with the open end of the shackle to lock the shackle into place around the foot rest and the shift lever. A lock plate is coupled to one of the elongate arms of the shackle. A cross bar plate removably attaches to the open end of the shackle and is configured for being positioned between the locking mechanism and the shift lever when the apparatus is attached to the motorcycle. When the apparatus is attached to the motorcycle, the motorcycle shift lever cannot be operated, thereby deterring theft of the motorcycle.

20 Claims, 5 Drawing Sheets

(58) Field of Classification Search
CPC ............ B62H 2005/008; B60R 25/063; B60R 25/002; B60R 25/003; B60R 25/005
See application file for complete search history.

(56) References Cited

U.S. PATENT DOCUMENTS

| | | | | |
|---|---|---|---|---|
| 1,402,725 | A * | 1/1922 | Pippen | B62H 5/142 70/227 |
| 1,525,340 | A * | 2/1925 | Troast | E05B 67/063 70/53 |
| 1,627,259 | A * | 5/1927 | Troast | E05B 67/22 70/53 |
| 1,635,711 | A * | 7/1927 | Fraim | E05B 67/22 70/463 |
| 4,106,315 | A * | 8/1978 | Dohanyos | E05B 67/38 292/281 |
| 4,238,941 | A * | 12/1980 | Halopoff | E05B 67/38 70/56 |
| 4,436,232 | A * | 3/1984 | Zane | B62J 11/00 224/450 |
| 4,725,075 | A * | 2/1988 | Biancardi | B62H 5/005 280/297 |
| 4,773,239 | A * | 9/1988 | Lowe | E05B 67/24 70/38 A |
| 4,777,809 | A * | 10/1988 | Wiggins | E05B 73/0076 70/57 |
| 5,069,049 | A * | 12/1991 | Shieh | B62H 5/142 70/227 |
| 5,329,793 | A * | 7/1994 | Chen | B60R 25/0221 70/226 |
| 5,911,765 | A * | 6/1999 | DaSilva | B60R 25/005 70/237 |
| 6,701,757 | B1 * | 3/2004 | Vito | B62H 5/00 70/53 |
| 8,181,496 | B2 * | 5/2012 | McDaid | E05B 67/063 70/53 |
| 10,006,227 | B1 * | 6/2018 | Szebeni | E05B 67/383 |

* cited by examiner

ANTI-THEFT APPARATUS FOR MOTORCYCLES

CROSS-REFERENCE TO RELATED APPLICATIONS

This application claims priority to U.S. Provisional Patent Application No. 63/226,394, filed on Jul. 28, 2021, and entitled "Anti-theft apparatus for motorcycles," the contents of which are hereby incorporated herein by reference.

BACKGROUND

Field of the Art

This disclosure relates to anti-theft devices. More specifically, the present invention is for an anti-theft device for motorcycles.

Discussion of the State of the Art

On average, forty thousand motorcycles are stolen every year in the United States alone. For most motorcycle riders, a motorcycle represents not only stress relief but a great investment as well. Most motorcycle riders will not be able to recover their investment if/when their motorcycle is stolen and/or will take years before they are able to acquire one again.

A motorcycle's shift lever is generally controlled by the user's foot and changes gears by moving upwards (for up-shifting) or downwards (for down-shifting) from its starting position. Moreover, the movement of the shift lever could cause problems to the transmission if the engine is not running. As a result, shift lever-based locking systems are not very useful in preventing theft and reducing damage to the motorcycle.

Some have tried to deter the number of motorcycles stolen by creating devices that may potentially damage the same motorcycle they are trying to protect. For example, disk locks, which are locking mechanisms for the immobilization of the brake disk, could potentially damage the caliper of the motorcycle if forgotten. In another example, chain locks that can scratch and/or dent the motorcycle are impractical for everyday use. Furthermore, other devices only address the issue of motorcycles stolen (such as locking mechanisms for clutch immobilization), but do not save the motorcycle from damage.

As such, there is a need for a device that prevents theft of the motorcycle, avoids damage to the motorcycle, is relatively easy to use, and is easily portable.

SUMMARY

This invention is for an anti-theft device apparatus that is removably attached to the shift lever and the foot rest of a motorcycle in order to eliminate the possibility of shifting gears, thus making the motorcycle un-drivable.

A benefit of the inventive apparatus is that it will allow the user to lower the possibility of his or her motorcycle being stolen while providing a cost-effective, practical anti-theft option that is accessible to all motorcycle users.

The apparatus of the present invention overcomes the problems previously stated by preventing the shift lever of the motorcycles from moving. Thereby, the possibility of shifting the gears of the motorcycle is eliminated so the motorcycle cannot be driven. As such, the apparatus of the present invention is advantageous for preventing theft of the motorcycle. Further, the apparatus is advantageous for protecting the motorcycle's gearbox, which is one of the components of highest financial value.

In one example, the anti-theft apparatus is configured for being removably attached to a shift lever and a foot rest of a motorcycle. The apparatus includes a shackle that is sized and shaped to extend from the foot rest to the shift lever. The shackle has an open end, a second end opposite of the open end, and two elongate arms that extend between the second end and the open end. The shackle may be a U-shaped shackle and the second end of the shackle may be a closed, curved end. The second end of the shackle may be sized and shaped to directly contact the foot rest when the apparatus is attached to the motorcycle. The two elongate arms may be parallel to each other, or may be tapered, bent, or curved.

The apparatus further includes a locking mechanism that removably locks to the open end of the shackle. The locking mechanism may be a padlock style lock, a combination lock, or a biometric lock. The locking mechanism may have two openings that extend therethrough, and the two openings may be sized and shaped to accommodate the two elongate arms of the shackle passing through the two openings. The shackle may further include at least one groove on at least one of the elongate arms, and the locking mechanism may be configured to engage with the at least one groove to lock to the shackle. The shackle may include a plurality of grooves on at least one of the elongate arms, and the locking mechanism may be configured to engage with one of the grooves to lock to the shackle.

Still further, the apparatus includes a lock plate coupled to one of the elongate arms of the shackle. The lock plate and the one of the elongate arms may be parallel to each other and coupled together along their respective lengths. The lock plate may be coupled to the one of the elongate arms of the shackle with screws, bolts, welding, or adhesive. The lock plate and the shackle may be a unitary piece. The lock plate may have a rectangular shape. The lock plate may have a trapezoidal shape, wherein a width of the lock plate tapers from a larger width on one end to a smaller width on the other, opposite end of the lock plate. The lock plate may be in direct contact with an upper surface of the foot rest when the apparatus is attached to the motorcycle.

The apparatus further includes a cross bar plate that removably attaches to the open end of the shackle and that is configured for being positioned between the locking mechanism and the shift lever when the apparatus is attached to the motorcycle. The locking mechanism and the cross bar plate may be a unitary piece. The cross bar plate may include a main portion having two openings that are sized and shaped for the respective two elongate arms of the shackle to pass therethrough, and a tab that extends perpendicularly to the main portion, wherein the tab may be configured to be positioned between the shift lever and the motorcycle when the apparatus is attached to the motorcycle. The cross bar plate may be directly adjacent to the shift lever when the apparatus is attached to the motorcycle.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

This invention is directed to an anti-theft apparatus that removably attaches to the shift lever and the foot rest of a motorcycle in order to eliminate the possibility of shifting gears, thus making the motorcycle un-drivable. The apparatus includes a shackle having a closed end and an open end, a locking mechanism that attaches to the open end of the shackle, a lock plate that is fixedly attached to an elongate arm of the shackle, and a cross bar plate that attaches to the open end of the shackle.

The invention is described by reference to various elements herein. It should be noted, however, that although the various elements of the inventive apparatus are described separately below, the elements need not necessarily be separate. The various embodiments may be interconnected and may be cut out of a singular block or mold. The variety of different ways of forming an inventive apparatus, in accordance with the disclosure herein, may be varied without departing from the scope of the invention.

Generally, one or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices and parts that are connected to each other need not be in continuous connection with each other, unless expressly specified otherwise. In addition, devices and parts that are connected with each other may be connected directly or indirectly through one or more connection means or intermediaries.

A description of an aspect with several components in connection with each other does not imply that all such components are required. To the contrary, a variety of optional components may be described to illustrate a wide variety of possible embodiments and in order to more fully illustrate one or more embodiments. Similarly, although process steps, method steps, or the like may be described in a sequential order, such processes and methods may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, or method is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Alternate implementations are included within the scope of various embodiments in which, for example, functions may be executed out of order from that shown or discussed, including substantially concurrently or in reverse order, depending on the functionality involved, as would be understood by those having ordinary skill in the art.

Figure 1A:
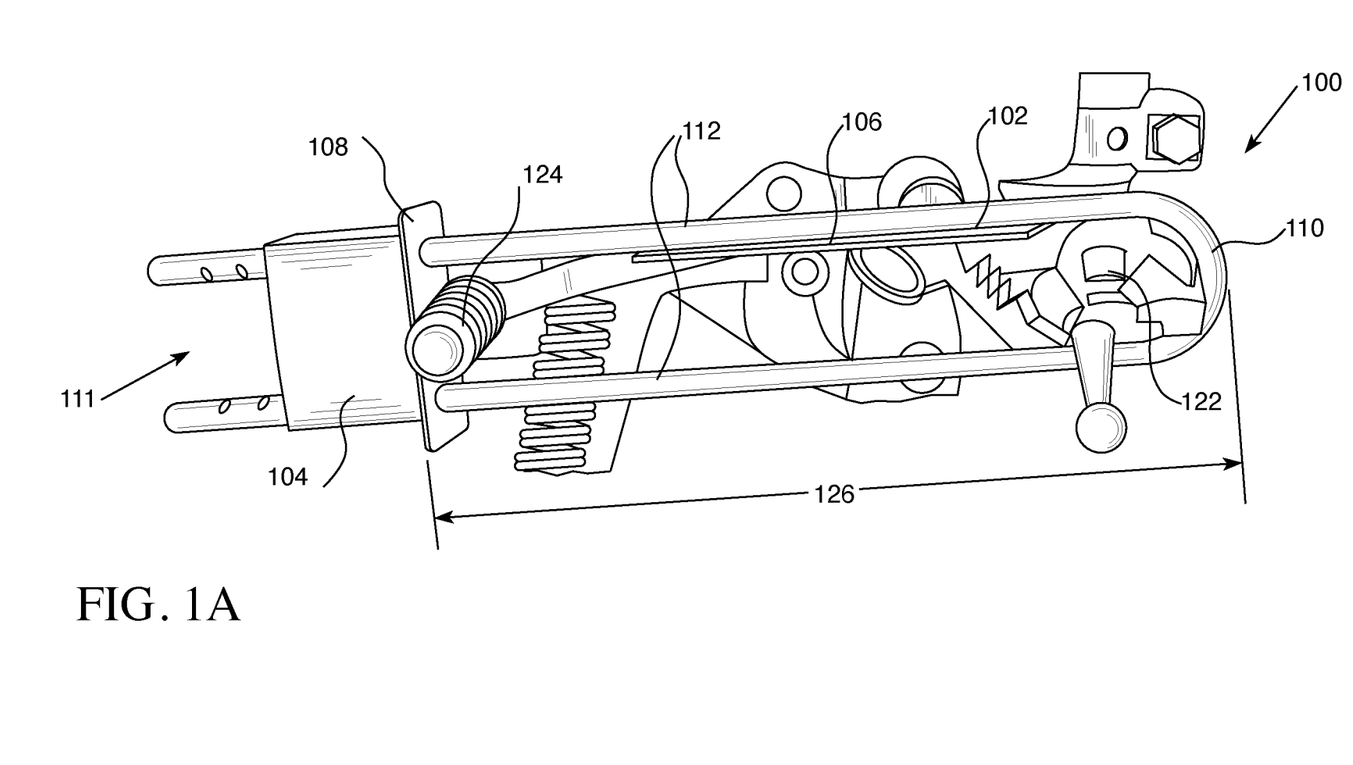
FIGS. 1A and 1B are a side view and a top perspective view, respectively, of an anti-theft device attached to a motorcycle, in accordance with one embodiment of the present invention.
Figure 1B:
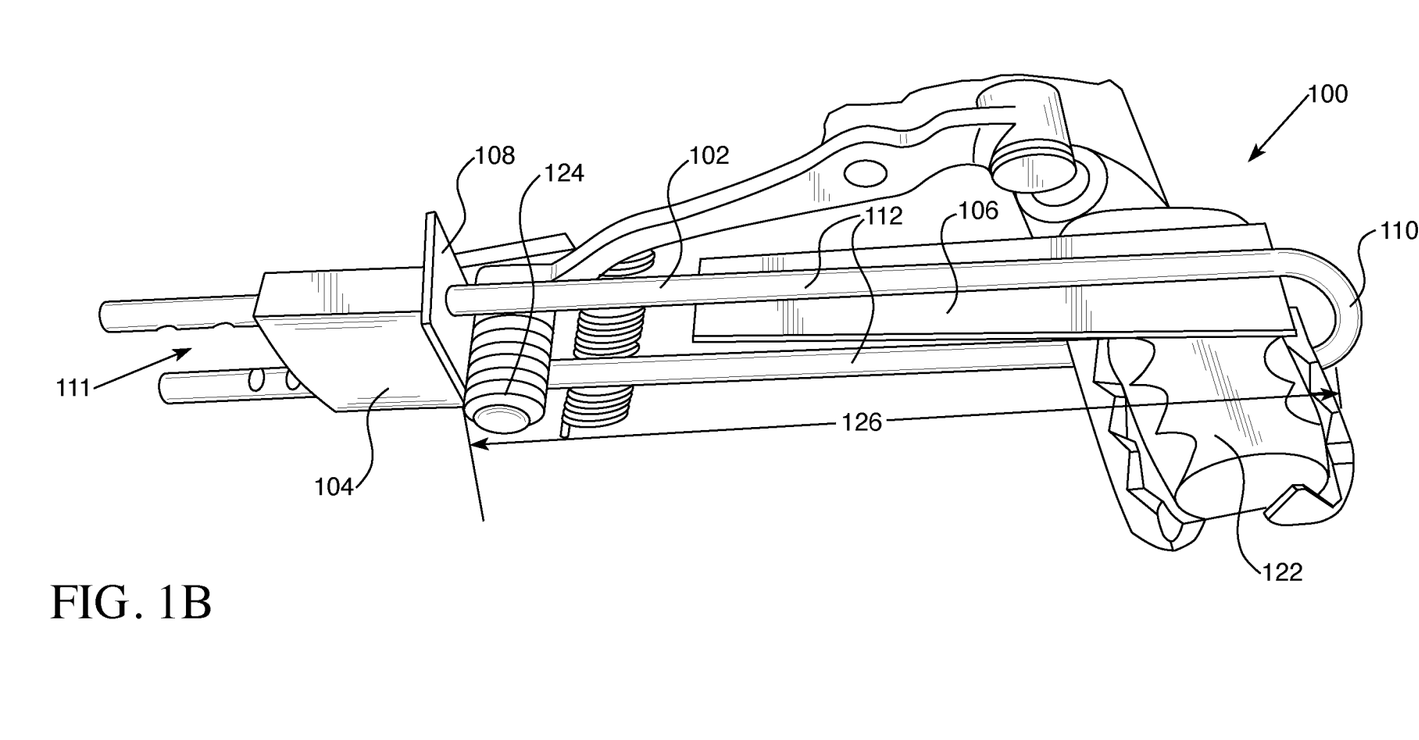

The present invention is for an anti-theft apparatus that removably attaches to the shift lever and the foot rest of a motorcycle in order to eliminate the possibility of shifting gears, thus making the motorcycle un-drivable. As shown in FIGS. 1A and 1B, the apparatus 100 includes a shackle 102 that is sized and shaped to go around the foot rest 122 and the shift lever 124 of the motorcycle. The apparatus 100 further includes a locking mechanism 104, a lock plate 106, and a crossbar plate 108. The lock plate 106 and the closed portion 110 of the shackle 102 are in contact with the motorcycle foot rest 122 when the apparatus 100 is in use. The arms 112 of the shackle 102 and the crossbar plate 108 are in contact with the motorcycle shift lever 124 when the apparatus 100 is in use.

Figure 2A:
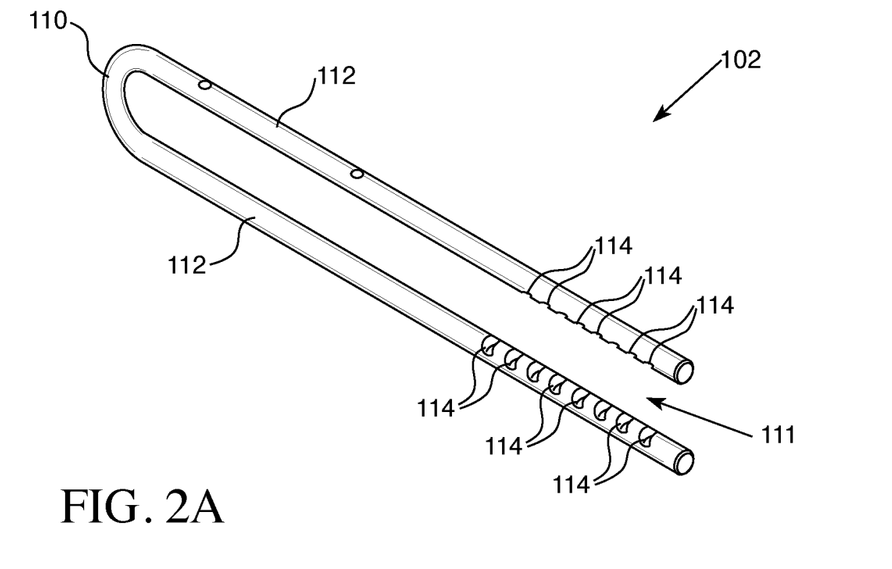
FIGS. 2A and 2B are perspective views of two examples of a shackle portion of an anti-theft device, in accordance with embodiments of the present invention.

Turning now to FIG. 2A, the shackle 102 will be described in more detail. The shackle 102 includes a closed end 110, an open end 111, and two elongated arms 112 extending from the closed end 110 to the open end 111. The elongated arms 112 are coextensive with the closed portion 110 and are parallel to each other. The shackle 102 is made of a strong, rigid material, such as steel or other metals, hard plastic, resin, or the like. The free ends of the arms 112 opposite of the closed portion 110 include a plurality of indentations or grooves 114. Although the shackle 102 is depicted as having grooves 114 on both arms 112, it will be readily understood by one of ordinary skill in the art that the shackle 102 may alternatively have grooves 114 on only one of the arms 112. The locking mechanism 104 is locked to the shackle 102 in one of the grooves 114. By having several grooves 114, the distance 126 (see FIGS. 1A and 1B) between the closed portion 110 and the locking mechanism 104 can be adjusted by attaching the locking mechanism 104 to the set of grooves 114 that best fits the motorcycle. Different motorcycle styles, sizes, brands, etc., have different distances between the shift lever 124 and the foot rest 122. As such, by having several sets of grooves 114 and the ability to adjust the distance 126, the apparatus 100 is compatible with many different motorcycle configurations. In one example, the distance 126 between the closed portion 110 and the locking mechanism 104 may be approximately 5 to 14 inches. In this manner, the apparatus 100 can be used with many different motorcycles having varying distances between the foot rest and the shift lever.

Figure 2B:
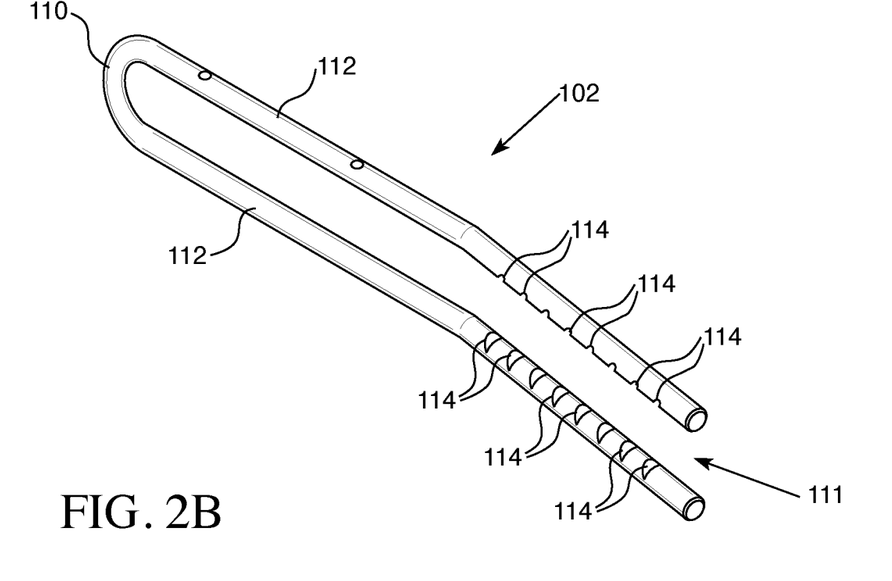

Although the shackle 102 is depicted as having a U-shape, one of ordinary skill in the art would readily understand that other shapes are within the scope of the present invention. For example, the shackle may be rectangular, H-shaped, or the like. As such, the closed portion 110 is depicted as being curved, but may alternatively be a straight piece that is perpendicular to the arms 112 and connects the elongated arms 112 to each other. In another example, the shackle 102 may include two open ends and locking mechanisms attached to each end. In yet another example, rather than being parallel to each other, the elongated arms 112 may be curved, bent, or may be tapered towards each other or away from each other. For example, as shown in FIG. 2B, the elongated arms 112 are bent such that the open end 111 of the shackle 102 is at an angle relative to the closed end 110.

Although the shackle 102 is depicted as having grooves 114 for engaging with the locking mechanism 104, it will be readily understood by one of ordinary skill in the art that the shackle 102 may alternatively have other connection mechanisms, depending on the type of locking mechanism 104 that is used. For example, the shackle 102 may have attachment points that include through openings, pins, tabs, and/or the like.

Figure 3:
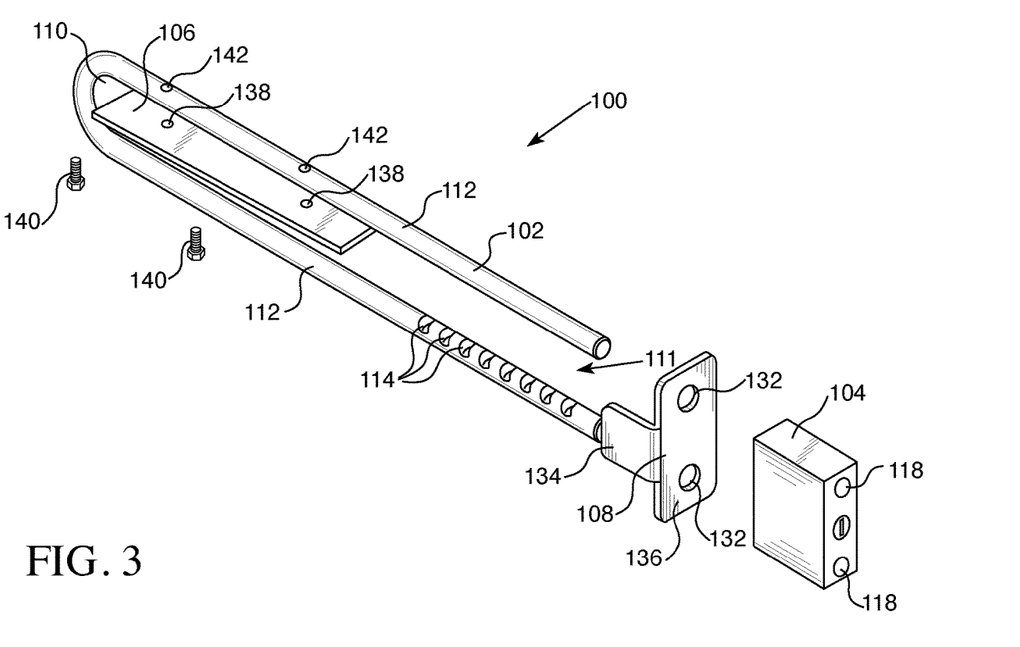
FIG. 3 is an exploded view of an anti-theft device, in accordance with one embodiment of the present invention.

The locking mechanism 104, shown in FIGS. 1A, 1B, and 3, includes openings 118 that are sized and shaped so that the arms 112 of the shackle 102 may pass therethrough. In the example shown in FIGS. 1A and 1B, the free ends of the elongated arms 112 pass through the openings 118 and extend behind the locking mechanism 104 when the apparatus 100 is attached to the motorcycle. When locked, the internal latches of the locking mechanism 104 engage with the grooves 114 in the ends of the shackle arms 112. The locking mechanism 104 is depicted as being a padlock-style locking mechanism. However, other types of locking mechanisms are within the scope of the invention. For example, the locking mechanism 104 may be a combination lock, a biometric lock, or the like.

Figure 4:
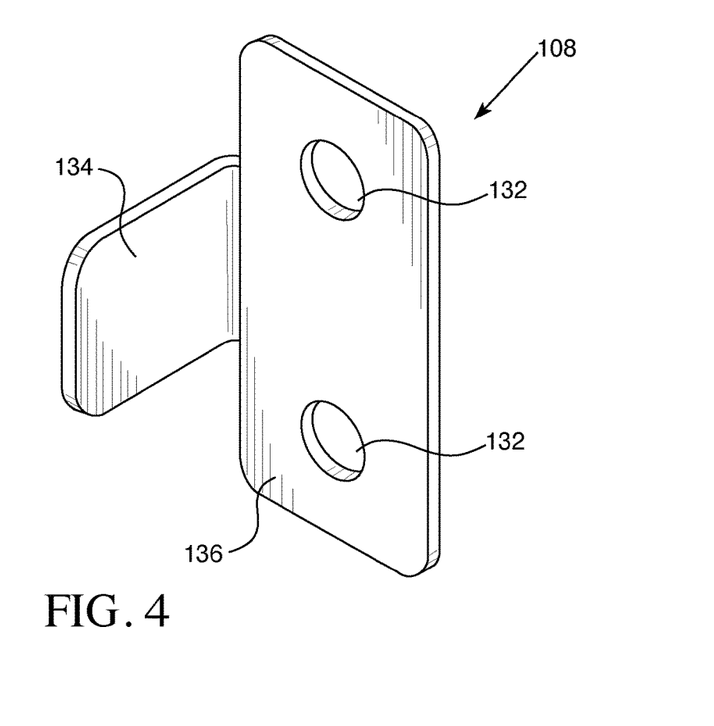
FIG. 4 is a perspective view of a cross bar plate portion of an anti-theft device, in accordance with one embodiment of the present invention.

When the apparatus 100 is attached to the motorcycle, the crossbar plate 108 is positioned between the locking mechanism 104 and the motorcycle shift lever 124. Depicted in greater detail in FIG. 4, the crossbar plate 108 includes holes 132 that are sized and shaped so that the arms 112 of the shackle 102 can pass therethrough. The holes 132 on the crossbar plate 108 align with the holes 118 in the locking mechanism 104 when the apparatus 100 is in use. Additionally or alternatively, the crossbar plate 108 and the locking mechanism 104 may be fixedly coupled to each other or made as a unitary piece. The crossbar plate 108 further includes a tab 134 that extends perpendicular to the main portion 136 of the crossbar plate 108. The tab 134 is positioned behind the shift lever 124 when the apparatus 100 is in use to prevent the apparatus 100 from being pulled off of the shift lever 124. More specifically, the tab 134 is positioned between the shift lever 124 and the motorcycle when the apparatus 100 is in use. The tab 134 may have any size, shape, or dimension, so long as it is sized and shaped to fit between the shift lever 124 and the main body of the motorcycle.

Figure 5:
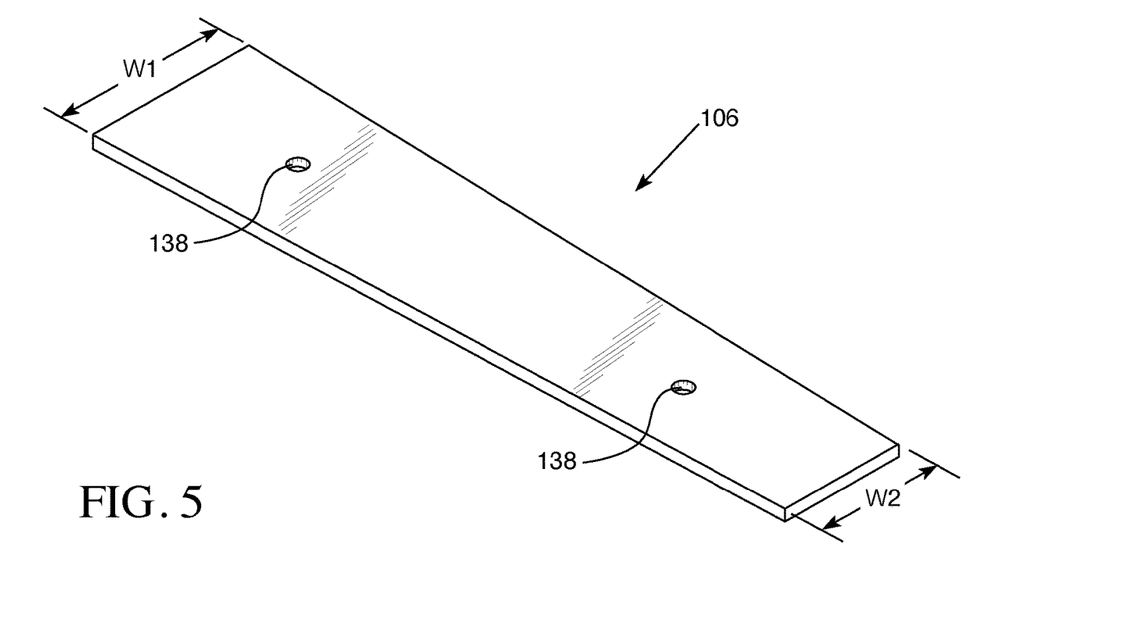
FIG. 5 is a perspective view of a lock plate portion of an anti-theft device, in accordance with one embodiment of the present invention.

The lock plate 106 is depicted in greater detail in FIG. 5. The lock plate 106 is attached to one of the arms 112 the shackle 102 in a location between the grooves 114 and the closed portion 110 of the shackle 102. The lock plate 106 and the arm 112 of the shackle 102 are parallel to each other and coupled together along their respective lengths. The lock plate 106 may include holes 138 for attaching the lock plate 106 to the shackle 102. For example, the lock plate 106 may be attached to the shackle 102 using screws or bolts 140 that pass through the holes 138 in the lock plate 106 and holes 142 in the shackle 102 (see FIG. 3). Alternatively, the lock plate 106 may be attached to the shackle 102 by welding, adhesive, or the like. In another example, the shackle 102 and the lock plate 106 may be manufactured as a unitary piece rather than being coupled together. In yet another example, a portion of the shackle arm 112 may be a flat plate, thereby eliminating the need for a lock plate 106 that is removably or fixedly coupled to the shackle arm 112. When the apparatus 100 is in use, the lock plate 106 engages with the top surface of the motorcycle foot rest 122. Alternatively, the lock plate 106 may engage with the bottom surface of the motorcycle foot rest 122 when the apparatus 100 is in use. In another example, the apparatus may include two lock plates and the foot rest 122 may be sandwiched between the lock plates when the apparatus 100 is attached to the motorcycle. This engagement between the lock plate 106 and the foot rest 122 prevents the apparatus 100 from slipping off of the foot rest 122. In other words, the flat bottom surface of the lock plate 106 engages with the top surface of the foot rest 122 in order to prevent rotational movement between the apparatus 100 and the foot rest 122. The width of the lock plate 106 tapers from a greater width W1 at one end to a smaller width W2 at the opposite end. The tapered width of the lock plate 106 enables the apparatus 100 to be compatible with different types and styles of motorcycles having different types and styles of foot rests. However, the invention is not limited to a lock plate 106 having a tapered width. In another example, the lock plate 106 may be rectangular rather than trapezoidal and may have a constant width along its entire length. The width of the lock plate 106 may be between 0.5 and 1.5 inches, and the length of the lock plate 106 may be between 2 and 6 inches. In other examples, the lock plate 106 may alternatively have other shapes and dimensions.

The apparatus 100 may be provided as a kit having the parts depicted in FIG. 3. That is, the apparatus 100 may be provided as a kit that includes the shackle 102, the locking mechanism 104, the lock plate 106, the crossbar plate 108 and the attachment mechanism 140 for attaching the lock plate 106 to the shackle 102. In one example, the kit includes at least one lock plate 106, but preferably includes two or more lock plates 106 having different thicknesses. In this manner, the kit may be used on many different motorcycle configurations, types, brands, etc. The kit may include a first lock plate 106 having a 2 mm thickness, a second lock plate 106 having a 2.5 mm thickness, a third lock plate 106 having a 3 mm thickness, etc. The user of the kit may select the lock plate 106 having a thickness that is the most compatible with their motorcycle. Further, the kit may include lock plates 106 having different geometries, such as different lengths, widths, shapes, etc., so that the user can select the lock plate 106 having the geometry that is the most compatible with their motorcycle.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. An anti-theft apparatus configured for being removably attached to a shift lever and a foot rest of a motorcycle, wherein the apparatus comprises:
    a shackle that is sized and shaped to extend from the foot rest to the shift lever, wherein the shackle comprises an open end, a second end opposite of the open end, a first elongate arm having a first longitudinal axis, and a second elongate arm having a second longitudinal axis, wherein the first elongate arm and the second elongate arm extend between the second end and the open end;
    a locking mechanism that removably locks to the open end of the shackle;
    a lock plate comprising a top surface, a bottom surface, and a third longitudinal axis, the top surface having a length and a width, wherein the top surface is directly coupled to the first elongate arm of the shackle along an entirety of the length of the top surface in a fixed orientation with the third longitudinal axis being parallel to the first longitudinal axis, and wherein the lock plate does not contact the second elongate arm; and
    a cross bar plate that removably attaches to the open end of the shackle and that is configured for being positioned between the locking mechanism and the shift lever when the apparatus is attached to the motorcycle.

2. The apparatus of claim 1, wherein the two elongate arms are parallel to each other.

3. The apparatus of claim 1, wherein the two elongate arms are tapered, bent, or curved.

4. The apparatus of claim 1, wherein the shackle further comprises at least one groove on at least one of the elongate arms, and wherein the locking mechanism is configured to engage with the at least one groove to lock to the shackle.

5. The apparatus of claim 1, wherein the shackle further comprises a plurality of grooves on at least one of the elongate arms, and wherein the locking mechanism is configured to engage with one of the grooves to lock to the shackle.

6. The apparatus of claim 1, wherein the locking mechanism is one of: a padlock style lock, a combination lock, and a biometric lock.

7. The apparatus of claim 1, wherein the locking mechanism comprises two openings that extend therethrough, the two openings being sized and shaped to accommodate the two elongate arms of the shackle passing through the two openings.

8. The apparatus of claim 1, wherein the lock plate is directly coupled to the first elongate arm of the shackle with screws, bolts, welding, or adhesive.

9. The apparatus of claim 1, wherein the lock plate and the shackle are a unitary piece.

10. The apparatus of claim 1, wherein the locking mechanism and the cross bar plate are a unitary piece.

11. The apparatus of claim 1, wherein the shackle is a U-shaped shackle and the second end of the shackle is a closed, curved end.

12. The apparatus of claim 1, wherein the cross bar plate comprises:
    a main portion having two openings that are sized and shaped for the respective two elongate arms of the shackle to pass therethrough; and
    a tab that extends perpendicularly to the main portion, wherein the tab is configured to be positioned between the shift lever and the motorcycle when the apparatus is attached to the motorcycle.

13. The apparatus of claim 1, wherein the second end of the shackle is sized and shaped to directly contact the foot rest when the apparatus is attached to the motorcycle.

14. The apparatus of claim 1, wherein the lock plate has a rectangular shape.

15. The apparatus of claim 1, wherein the lock plate has a trapezoidal shape.

16. The apparatus of claim 1, wherein the cross bar plate is configured to be directly adjacent to the shift lever when the apparatus is attached to the motorcycle.

17. An anti-theft apparatus comprising:
- a shackle having an open end, a second end opposite of the open end, a first elongate arm having a first longitudinal axis, and a second elongate arm having a second longitudinal axis, wherein the first elongate arm and the second elongate arm extend between the second end and the open end;
- a locking mechanism that removably locks to the open end of the shackle;
- a lock plate comprising a top surface, a bottom surface, and a third longitudinal axis, the top surface having a length and a width, wherein the top surface is directly coupled to the first elongate arm of the shackle along an entirety of the length of the top surface in a fixed orientation with the third longitudinal axis being parallel to the first longitudinal axis, and wherein the lock plate does not contact the second elongate arm; and
- a cross bar plate that removably attaches to the open end of the shackle.

18. The anti-theft apparatus of claim 17, wherein the lock plate is directly coupled to the first elongate arm of the shackle with screws, bolts, welding, or adhesive.

19. The anti-theft apparatus of claim 17, wherein the lock plate is a flat rectangular plate.

20. The apparatus of claim 1, wherein the lock plate is directly coupled to the first elongate arm using screws or bolts, and wherein the lock plate comprises openings that extend through an entire thickness of the lock plate from the top surface to the bottom surface, and wherein the screws or bolts pass through the lock plate openings and engage with corresponding openings in the first elongate arm.

* * * * *